United States Patent [19]
Choi

[11] Patent Number: 5,671,206
[45] Date of Patent: Sep. 23, 1997

[54] OPTICAL PICKUP DEVICE

[75] Inventor: Yang-Oh Choi, Seoul, Rep. of Korea

[73] Assignee: Daewoo Electronics Co., Ltd., Seoul, Rep. of Korea

[21] Appl. No.: 528,645

[22] Filed: Sep. 7, 1995

[30] Foreign Application Priority Data

Oct. 26, 1994 [KR] Rep. of Korea ............... 94-27373

[51] Int. Cl.$^6$ .................................................. G11B 7/00
[52] U.S. Cl. .................. 369/112; 369/110; 369/13; 369/44.14; 369/44.37
[58] Field of Search .......................... 369/112, 110, 369/111, 109, 100, 103, 13, 93, 94, 44.37, 44.38, 44.14, 44.12, 106

[56] References Cited

U.S. PATENT DOCUMENTS

| 4,905,214 | 2/1990 | Nagashima | 369/106 X |
| 5,408,453 | 4/1995 | Holtslag et al. | 369/112 X |

*Primary Examiner*—Muhammad N. Edun
*Attorney, Agent, or Firm*—Beveridge, DeGrandi, Weilacher & Young LLP

[57] ABSTRACT

An optical pickup device for recording/reproducing an optical disc having at least two data storing layers on one side thereof generates a first and second laser beams of same polarization (S-polarized beams) from a first and second laser beam sources. The laser beams are incident on a prism of a cubic type in which a dielectric coating layer for selectively total reflecting or total transmitting depending to a polarizing state of an incident beam is formed at a diagonal surface (45°) of the prism. Instead of the prism of the cubic type, only a dielectric coating plate may be positioned at the diagonal surface of the prism. The first S-polarized beams is total reflected by the dielectric coating layer for reading out information recorded on a first layer of the optical disc. The second S-polarized beams is total reflected toward a polarization converting plate, and thus the beam is converted into P-polarized light to return to the prism. The P-polarized beams is total transmitted through the dielectric coating layer for reading out information recorded on a second layer of the optical disc.

7 Claims, 4 Drawing Sheets

OPTICAL PICKUP DEVICE

BACKGROUND OF THE INVENTION

1. Field of the Invention

The present invention relates to an optical pickup device, and more particularly to an optical pickup device capable of easily realizing recording/reproducing of an optical disc having at least two recording layers on one side thereof.

2. Description of the Prior Art

Information reproducing/recording systems for using optical discs such as laser discs or compact discs have been developed in recent days. Higher data densities are desirable for a variety of reasons, including the ability to make compact discs smaller and to enable the recording of High Definition Television (HDTV) compatible video discs.

One method considered possible for achieving a high data density in an optical data medium was to focus the read laser to an even finer beam diameter, but the maximum practical limit to the numerical aperture (NA) of an objective lens which focuses the laser is approximately 0.6. It would also be possible to obtain a similar result by shortening the laser wavelength, but a wavelength of a practical semiconductor laser is limited for the present.

A second method for achieving a high density is to use V-grooves in the optical disc, such as disclosed in U.S. Pat. No. 4,569,038 issued to Nagashima et al. (Feb. 4, 1986).

The capacity of the data recordable on an optical disc using conventional technologies is determinable. For an optical disk housed in a 3.5 inch cassette case, the disc diameter is approximately 86 mm, providing a data storage area with a radius of 25 mm to 41 mm. It is assumed that a 670 nm wavelength laser is used with a 0.55 NA objective lens. With a 0.8 m track pitch (1.6 µm V-groove pitch) and 0.47 µm bit length, the unformatted single-side capacity is 1.1 Gbytes. Using the standard CD format, a single-side formatted capacity of 550 Mb, the same as a 12 µcm CD, can be obtained.

If information conventionally provided as printed material is to be provided in the future on a CD-ROM or other optical data medium, it will also be necessary and convenient if the user is able to write to the medium to record notes as is done currently with paper media, instead of only being able to read the information. One method which makes this possible divides the disc into a read/writable areas, wherein a recording film is formed on the inside portion of the disc, and a read-only data area comprising a reflective metal film on the outside portion of the disc. However, this method reduces the read-only data area, and therefore limits the amount of information distributable on a single disc.

As described above, while smaller, higher capacity optical data media, including optical discs and cards, are desirable. To satisfy this requirements, an optical medium having two data recording layers has been developed, and such an optical pickup device is disclosed in U.S. Pat. No. 5,134,604 issued to Nagashima et al.

A conventional optical pickup device will be described in detail with reference to FIG. 1 below.

FIG. 1 is a schematic view of the conventional optical pickup device. A light source 10 is a laser diode for generating a laser beam for recording/reproducing information on/from an optical disc D. The laser beam from laser diode 10 is converted into parallel rays through a collimator lens 11. The beams converted into the parallel rays by collimator lens 11 sequentially pass through a beam splitter 12, an objective lens 14 and a transparent substrate 16 to be incident to the surface of optical disc D with a beam spot of approximately 1 µm diameter.

Here, beam splitter 12 is provided in such a manner that two right-angled prisms are installed to oppose to each other along respective inclination planes of 45°, and a coating layer 13 is formed along the contacting portion of the prisms, thereby securing the property of travelling straight of the incident beam while transmitting some of the incident beam and reflecting the other incident beam at a right angle with respect to the incident beam.

The laser beam being straightly transmitted through beam splitter 12 passes through transparent substrate 16 which is removably arranged between objective lens 14 and optical disc D. The focal distance of the laser beam can be arbitrarily controlled in accordance with the arranged position, refractive index and thickness of transparent substrate 16. Therefore, the position, refractive index and thickness of transparent substrate 16 are properly determined to focus the beam from laser beam source 10 on a nearer data recording plane of optical disc D under the state of eliminating transparent substrate 16, and allow the laser beam to pass through transparent substrate 16 of a predetermined thickness prior to focusing on a farther data recording plane of optical disc D under the state of inserting transparent substrate 16 of the predetermined thickness.

The laser beam reflected at the right angle while passing through beam splitter 12 focuses while passing through a focusing lens installed along an optical path of the reflected light, and the light focused by focusing lens 15 is received into a light-receiving diode 17 divided by four or six. Using an image formed by the beam received into light-receiving diode 17, a positional accuracy, i.e., focusing error and tracking error, of the optical pickup device with respect to optical disc D is detected.

By this operation, the focusing and tracking are controllable along with reproducing the information on the basis of the amount of the reflected lights determined by pits of optical disc D.

According to the conventional optical pickup device constructed as above, however, a lot of equipments including a transferring apparatus of the transparent substrate and several sensors are required for inserting and eliminating the transparent substrate. Additionally, a working distance of the objective lens is shortened to make the control of the focusing and tracking a demanding job, thereby degrading quality of the pickup. Furthermore, it involves a technical difficulty since a tolerance below 0.1° should be controlled to insert the transparent substrate.

SUMMARY OF THE INVENTION

It is an object of the present invention to provide a more simplified and minimized optical pickup device capable of easily realizing recording/reproducing information on/from an optical disc having at least two data storing layers on one side thereof.

In order to achieve the above mentioned object, an optical pickup device according to the present invention comprises first and second laser beam sources for generating first and second laser beams having planes of the same polarization in order to record/reproduce information recorded on an optical disc, the first and second laser beam sources being opposite to each other, a beam splitter means for total reflecting or total transmitting the first and second laser beams depending to the polarization of the beams, the beam splitter means located on optical paths of the first and second laser beams, a polarization converting means located on optical paths of the second laser beams total reflected by the beam splitter means so that the second laser beam can be reflected and converted in its polarizing plane and thus the second laser beam can proceed along the optical path of the first laser beam, a condensing means for focusing the first and second laser beams onto the optical disc when the laser beams proceed toward the optical disc via the splitter means.

The above-mentioned beam splitter means preferably may be a prism of a cubic type in which a dielectric coating layer for selectively total reflecting or total transmitting depending to a polarizing state of an incident beam is formed at a diagonal surface of the prism.

The above-mentioned beam splitter means preferably may be a dielectric coating plate arranged with an incline of 45° on the basis of a line connecting first and second laser beam sources. That is, the above-mentioned beam splitter means preferably may be only a dielectric coating plate positioned at the diagonal surface without the prism of the cubic type.

The polarization of the first and second laser beam are so determined that the laser beams before passing through the polarization converting means are total reflected by the beam splitter means and the laser beams after passing through the polarization converting means are total transmitted by the beam splitter means.

According to the present invention, since the optical pickup device comprises first and second laser beam sources for generating first and second laser beams having the planes of the same polarization, a polarization converting means for converting the polarization of the beams, and a beam splitter means for selectively total reflecting or total transmitting the first and second laser beams depending to the polarization of the beams, the two beams of the same polarization generated from two laser source are converted into two beams of different polarizations when recording/reproducing information recorded on the disc having the two data storing layers on one side thereof, and thereby the two beams can record/reproduce the two data storing layers respectively.

According to the optical pickup device of the present invention, since the disc having the two data storing layers is reproduced with a beam splitter and a polarization converting means, it is possible to reduce the number of the constituent elements as compared with the conventional optical pickup device and it is easy and simple to perform the arrangement and positioning of the constituent elements.

BRIEF DESCRIPTION OF THE DRAWINGS

The above objects and other advantages of the present invention will become more apparent by describing in detail preferred embodiments thereof with reference to the attached drawings in which.

DESCRIPTION OF THE PREFERRED EMBODIMENT

An optical pickup device according to the present invention will be described in detail below.

Figure 1:
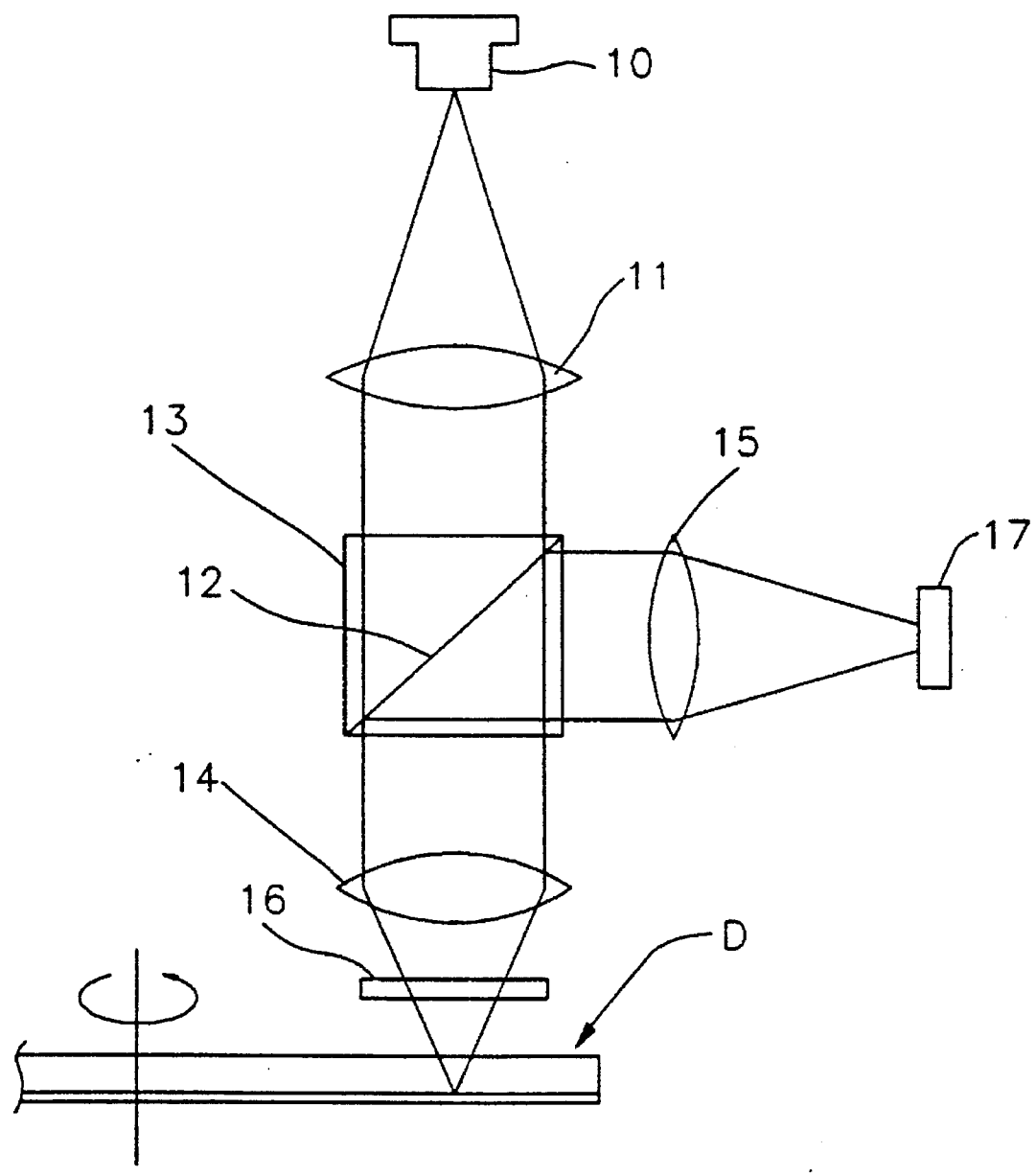
FIG. 1 is a schematic view for showing a conventional optical pickup device.
Figure 2:
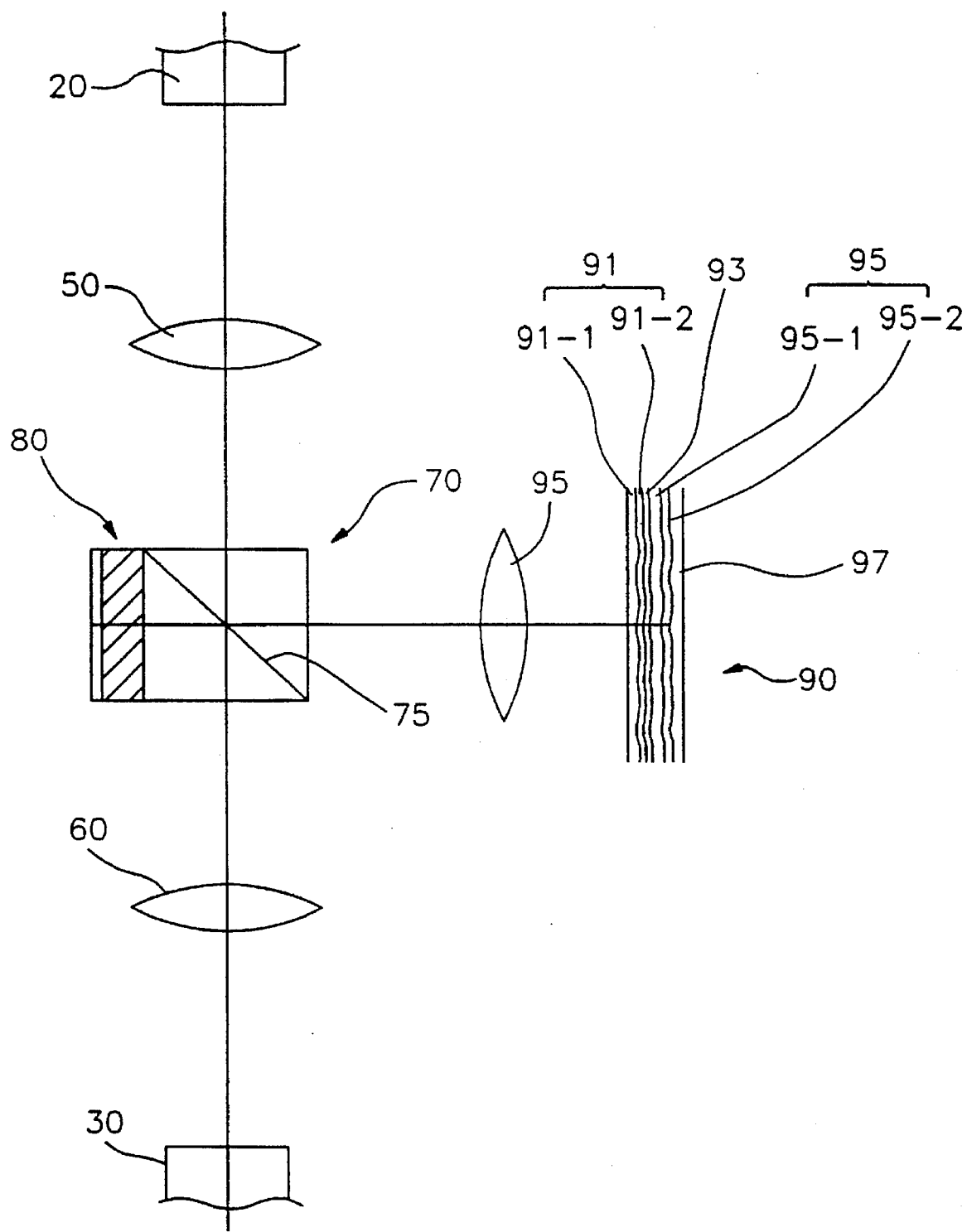
FIG. 2 is a schematic view for showing an optical pickup device according to the present invention.

FIG. 2 is a schematic view for showing the optical pickup device provided with first and second laser beam sources and a prism having a dielectric coating layer formed at the diagonal surface thereof according to one embodiment of the present invention.

Reference numerals 20 and 30 denote first and second laser diodes as laser beam sources for emitting first and second laser beams of S-polarized light (wavelength λ1). The first and second laser diodes 20, 30 are oppositely arranged to each other centering at a cubic prism 70.

Prism 70 is preferably a cubic prism as beam splitter, at diagonal surface of which is formed a dielectric coating layer 75 which can total reflect S-polarized light (λ1) from first and second laser diodes 20 and 30. As the preferable example, a dielectric coating plate arranged with an incline of 45° on the basis of a line connecting first and second laser beam sources. That is, only a dielectric coating layer may be displaced at the position corresponding to the diagonal surface instead the cubic prism.

A reference numeral 90 denotes an optical disc having a two data storing layers on one side thereof to enable recording or reproducing information. Optical disc 90 meets with the first and second laser diode 20 and 30 at right angles centering at prism 70. The incident beam on prism 70 from first or second laser diode 20, 30 is reflected by dielectric layer 75 formed at the 45° diagonal surface to be bent by 90°. Optical disc 90 is arranged on an optical path of the reflected beam for reading out data recorded on the two data storing layers of optical disc 90. A polarization converting plate 80 is provided at the opposite position to optical disc centering at prism 70. The laser beam of S-polarized light (λ1) is converted into the laser beam of P-polarized light (λ2) by polarization converting plate 80, and the laser beam of P-polarized light (λ2) is converted into the laser beam of S-polarized light (λ1) by polarization converting plate 80. The direction of the diagonal surface which dielectric coating layer 75 of prism 70 is formed is so determined that the first laser beam from first laser diode 20 can be total reflected by dielectric coating layer 75 to proceed toward optical disc 90.

Thus, the second laser beam emitted from second laser diode 30 opposite to first laser diode 20 centering at prism 70 is total reflected to the opposite direction as compared with the reflected direction of the beam emitted from the first laser diode 20. That is, the second laser beam is total reflected by dielectric coating layer 75 toward polarization converting plate 80 opposite to optical disc 90 centering at prism 70.

Furthermore, a first and second collimator lenses 50 and 60 can be respectively installed between first laser diode 20 and prism 70 and between second laser diode 30 and prism 50. The laser beams from first and second laser diodes 20 and 30 pass through collimator lens 50 and 60 to be converted into parallel beams, and then the beams is incident onto prism 70.

An objective lens 95 is provided between prism 70 and optical disc 90. When the laser beams emitted from first and second laser diode 30 and 30 proceed toward optical disc 90 via prism 70, these laser beams are focused onto optical disc 90.

Meanwhile, in the case of the first and second laser beam from first and second laser diode 20 and 30 are incident onto optical disc 90 from below, optical disc 20 having the two data storing layers comprises four layers sequentially stacked from below. That is, the four layers are stacked from the bottom side of disc 90 in the order of a first transparent layer 91 formed of a first layer 91-1 and a first recording layer 91-2 thereon, a thin film layer 93 which selectively total reflects only the laser beam of one wavelength (e.g., λ1) of the two wavelengths (λ1 and λ2) and total transmits the laser beam of the other wavelength (e.g., λ2), a second transparent layer 95 formed of a second layer 95-1 contacting the upper portion of thin film layer 93 and a second recording layer 95-2 thereon, and a reflection layer 97 for total reflecting the laser beam having the other wavelength (λ2). In this case, a material of the first recording layer of the first transparent layer is determined such that the first recording layer selectively acts upon not the laser beam of the wavelength λ2 but the laser beam of the wavelength λ1.

Hereinbelow, the operation of the optical pickup device according to the present invention constructed as above will be described with reference to FIGS. 3 and 4.

Figure 3:
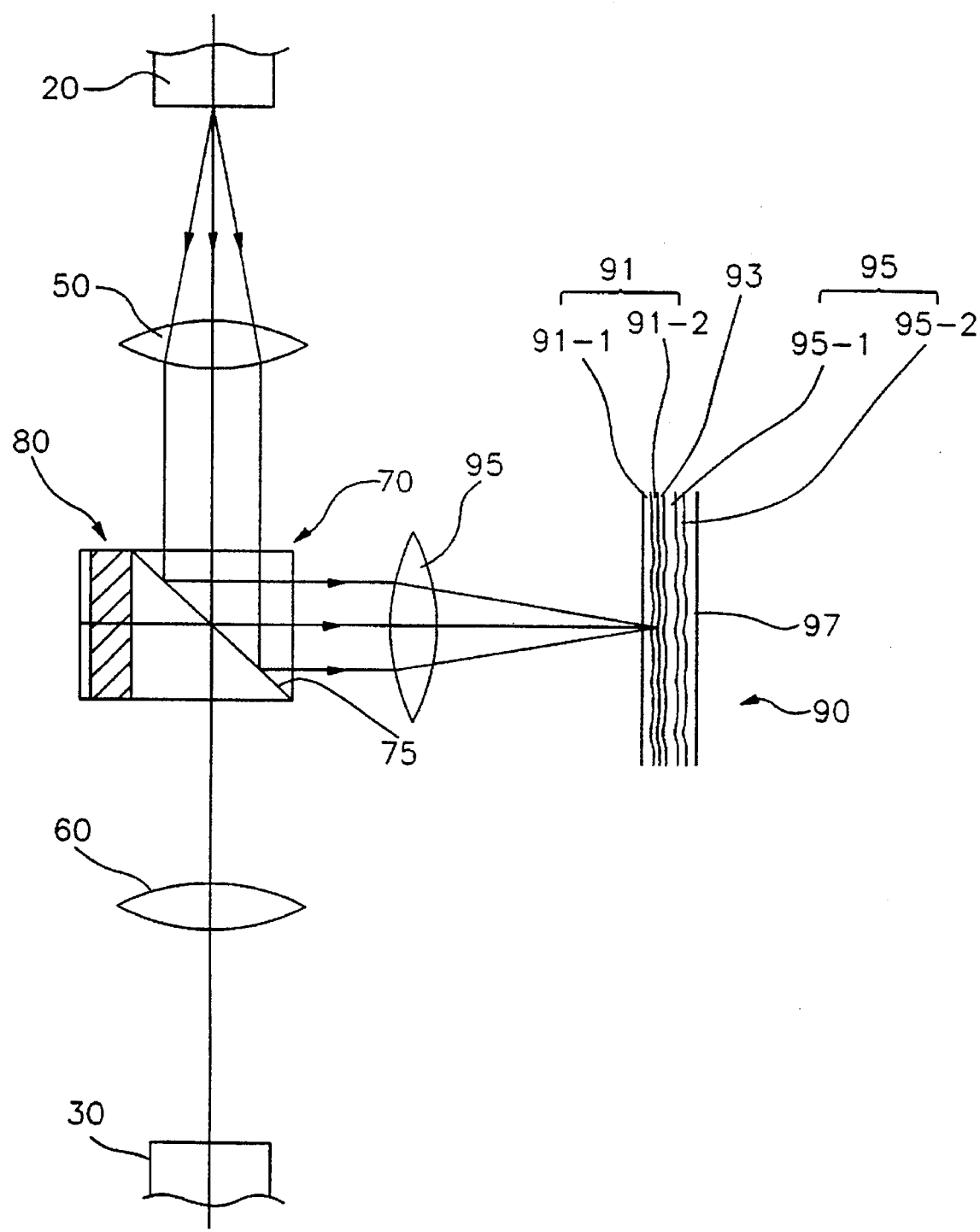
FIG. 3 is a view for illustrating an optical path of the first laser beam from the first laser beam source in the optical pickup device of FIG. 2.

FIG. 3 is a view for illustrating an optical path of the laser beam from the first laser beam source of the optical pickup device shown in FIG. 2. FIG. 4 is a view for illustrating an optical path of the laser beam from the second laser beam source of the optical pickup device shown in FIG. 2.

To begin with, as shown in FIG. 3, the first laser beam of S-polarized light (wavelength λ1) from first laser diode 20 is irradiated toward prism 70. This laser beam passes through collimator lens 50 to be converted into the parallel beam.

The laser beam converted into the parallel beam is incident onto prism 70 and then proceeds to dielectric coating layer formed at the diagonal surface of prism 70. S-polarized light is total reflected by dielectric coating layer 75 and p-polarized light is total transmitted. Thus, this beam is total reflected by dielectric coating layer 75 and bent by 90° to proceed toward optical disc 90. Thus, this beam (λ1) is incident onto optical disc 90 via objective lens 95. That is, the beam is incident onto first transparent layer 91 of disc 90, and thus it is possible to read out information recorded on first transparent layer 91 of disc 90.

Figure 4:
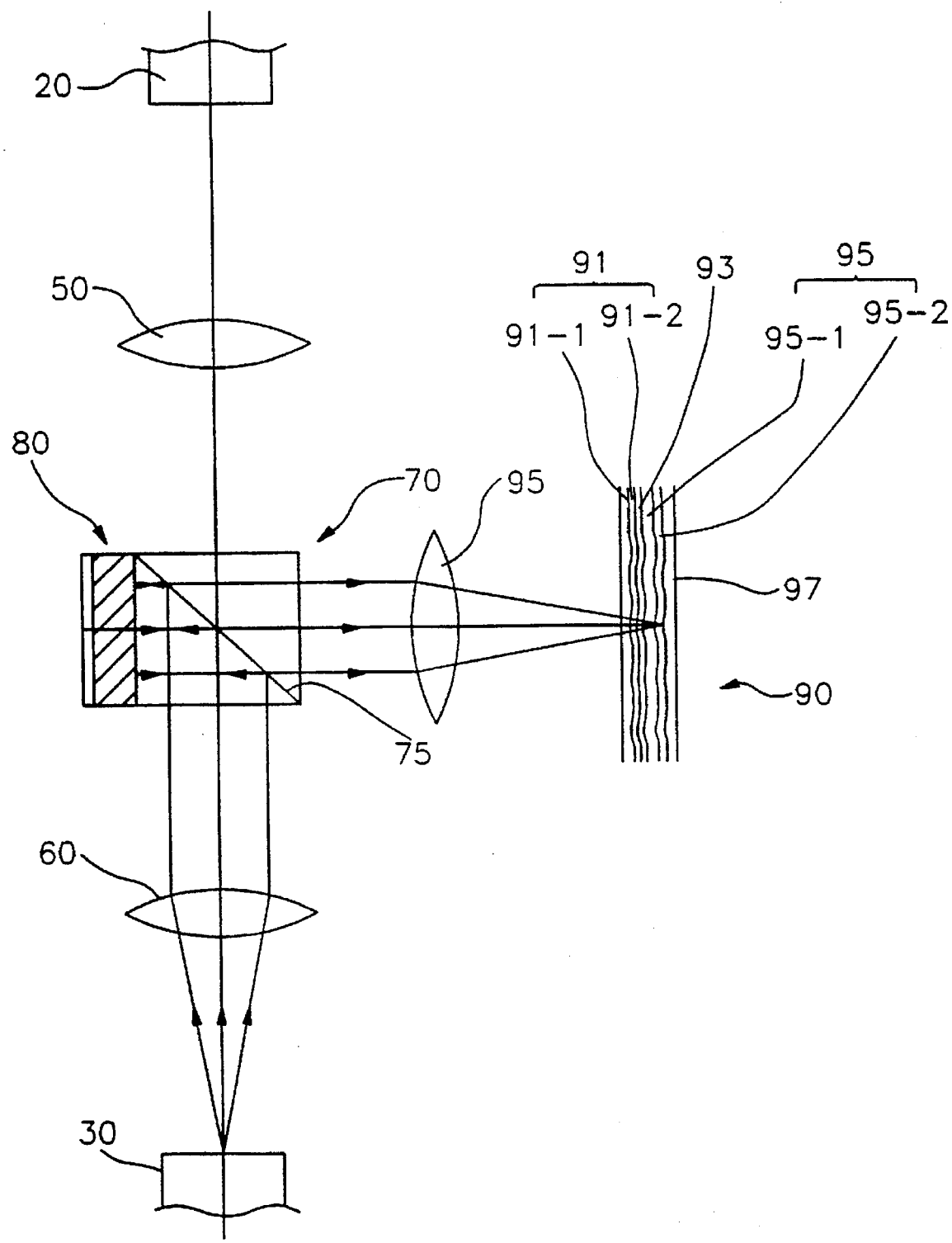
FIG. 4 is a view for illustrating an optical path of the second laser beam from the second laser beam source in the optical pickup device of FIG. 2.

Meanwhile, as shown in FIG. 4, the second laser beam of S-polarized light (wavelength λ1) from second laser diode 30 is also irradiated toward prism 70 as in the above case using first laser diode 20. This laser beam passes through collimator lens 60 to be converted into the parallel beam.

The laser beam converted into the parallel beam is incident onto prism 70, and then the beam is total reflected by dielectric coating layer 75, and the beam is total reflected to the opposite direction as compared with the reflected direction of the beam emitted from the first laser diode 20.

Thus, this beam is bent by 90° to proceed toward polarization converting plate 80 opposite to optical disc 90 centering at prism 70. The beam (S-polarized light) is incident on polarization converting plate 80 and reflected from it, and thus the beam is converted into p-polarized light.

The converted beam returns to prism 70 toward optical disc 90. Since this incident beam is p-polarized light, this beam is total transmitted to be incident on optical disc 90 via objective lens 95.

Thus, this S-polarized beam (wavelength λ2) toward optical disc 90 is also incident onto optical disc 90 via objective lens 95 as in the case of the beam irradiated from first laser diode 20. The beam, however, is still transmitted through first transparent layer 91 (which does not act upon the laser beam of two wavelength λ2) of disc 90, and the beam is focused onto second transparent layer 95 of disc 90. Thus it is possible to read out information recorded on second transparent layer 95 of disc 90.

According to the present invention, since the optical pickup device comprises first and second laser beam sources for generating first and second laser beams having the planes of the same polarization, a polarization converting means for converting the polarization of the beams, and a beam splitter means for selectively total reflecting or total transmitting said first and second laser beams depending to the polarization of said beams, the two beams of the same polarization generated from two laser source are converted into two beams of different polarizations when recording/reproducing information recorded on the disc having the two data storing layers on one side thereof, and thereby the two beams can record/reproduce the two data storing layers respectively.

According to the optical pickup device of the present invention, since the disc having the two data storing layers is reproduced with a beam splitter and a polarization converting plate, it is possible to reduce the number of the constituent elements as compared with the conventional optical pickup device and it is easy and simple to perform the arrangement and positioning of the constituent elements.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup device comprising:

first and second laser beam sources which are opposite to each other and from which first and second laser beams are generated have a same wavelength and a same polarization in order to record/reproduce information recorded on an optical disk;

a beam splitter means for totally reflecting or totally transmitting said first and second laser beams depending on the polarization of said beams, said beam splitter means being located on optical paths of said first and second laser beams;

a polarization converting means located on an optical path of said second laser beam totally reflected by said beam splitter means, the polarization converting means reflecting said second laser beam to be returned to the beam splitter and converting a polarization of said second laser beam so that the second laser beam of which the polarization is converted can be transmitted through said beam splitter; and a condensing means for focusing onto said optical disc the first laser beam which is reflected and the second laser beam which is transmitted when said laser beams proceed toward said optical disc via said splitter means, wherein polarizing states of the first and second laser beams are determined so that said laser beams which are incident onto the beam splitter before passing through said polarization converting means are totally reflected from said beam splitter means due to polarizing states thereof, and thereafter said second laser beam after passing through said polarization converting means is totally transmitted through said beam splitter means due to a converted polarizing state.

2. An optical pickup device as claimed in claim 1, said beam splitter means preferably comprises a prism of a cubic type in which a dielectric coating layer for selectively total reflecting or total transmitting depending to a polarizing state of an incident beam is formed at a diagonal surface of the prism.

3. An optical pickup device as claimed in claim 1, wherein said beam splitter means preferably comprises a dielectric coating plate arranged with an incline of 45° on the basis of a line connecting first and second laser beam sources.

4. An optical pickup device as claimed in claim 1, wherein said optical disc having the two data storing layers comprises four layers sequentially stacked from the bottom side of the disc in the order of a first transparent layer formed of a first layer and a first recording layer thereon;

a thin film layer which selectively total reflects only the laser beam of one wavelength of the two wavelengths and total transmits the laser beam of the other wavelength;

a second transparent layer formed of a second layer contacting the upper portion of the thin film layer and a second recording layer thereon; and a reflection layer for total reflecting the laser beam having the other wavelength.

5. An optical pickup device as claimed in claim 1, further comprising first and second collimator lenses respectively installed between said first and second laser beam sources and said beam splitter means, whereby said first and second laser beams are converted into parallel beam by said collimator lenses to be incident on said beam splitter means.

6. An optical pickup device comprising:

first and second laser beam sources which are opposite to each other and from which first and second laser beams are generated have a same wavelength and a same polarization in order to record/reproduce information recorded on an optical disc;

a beam splitter means for totally reflecting or totally transmitting said first and second laser beams depending on the polarization of said beams, said beam splitter means being located on optical paths of said first and second laser beams, said beam splitter means preferably being a prism of a cubic type in which a dielectric coating layer for selectively totally reflecting or totally transmitting depending on a polarizing state of an incident beam is formed at a diagonal surface (45°) of the prism;

a polarization converting means located on an optical path of said second laser beam totally reflected by said beam splitter means, the polarization converting means reflecting said second laser beam to be returned to the beam splitter and converting a polarization of said second laser beam so that the second laser beam of which the polarization is converted can be transmitted through said beam splitter; and a condensing means for focusing onto said optical disc the first laser beam which is reflected and the second laser beam which is transmitted when said laser beams proceed toward said optical disc via said splitter means, wherein polarizing states of the first and second laser beam are determined so that said laser beams which are incident onto the beam splitter before passing through said polarization converting means are totally reflected from said beam splitter means due to polarizing states thereof, and thereafter said second laser beam after passing through said polarization converting means is totally transmitted through said beam splitter means due to a converted polarizing state, whereby said two beams of the same polarization generated from two laser sources are converted into two beams of different polarizations, and thereby the two beams record/reproduce information recorded on said optical disc having two data storing layers comprising four layers sequentially stacked from the bottom side of the disc in the order of:

a first transparent layer formed of a first layer and a first recording layer thereon;

a thin film layer which selectively totally reflects only the laser beam of one wavelength of the two wavelengths and totally transmits the laser beam of the other wavelength;

a second transparent layer formed of a second layer contacting the upper portion of the thin film layer and a second recording layer thereon; and a reflection layer for totally reflecting the laser beam having the other wavelength.

7. An optical pickup device comprising:

first and second laser beam sources which are opposite to each other and from which first and second laser beams are generated have a same wavelength and a same polarization in order to record/reproduce information recorded on an optical disc said first and second laser beam sources being opposite to;

a beam splitter means for totally reflecting or totally transmitting said first and second laser beams depending on the polarization of said beams, said beam splitter means being located on optical paths of said first and second laser beams, said beam splitter means preferably being a dielectric coating plate arranged with an incline of 45° on the basis of a line connecting first and second laser beam sources;

a polarization converting means located on an optical path of said second laser beam totally reflected by said beam splitter means, the polarization converting means reflecting said second laser beam to be returned to the beam splitter and converting a polarization of said second laser beam so that the second laser beam of which the polarization is converted can be transmitted through said beam splitter; and a condensing means for focusing onto said optical disc the first laser beam which is reflected and the second laser beam which is transmitted when said laser beams proceed toward said optical disc via said splitter means, wherein polarizing states of the first and second laser beam are determined so that said laser beams which are incident onto the beam splitter before passing through said polarization converting means are totally reflected from said beam splitter means due to polarizing states thereof, and thereafter said second laser beam after passing through said polarization converting means is totally transmitted through said beam splitter means due to a converted polarizing state, whereby said two beams of the same polarization generated from two laser sources are converted into two beams of different polarizations, and thereby the two beams record/reproduce information recorded on said optical disc having two data storing layers comprising four layers sequentially stacked from below, that is, the four layers stacked from the bottom side of the disc in the order of a first transparent layer formed of a first layer and a first recording layer thereon;

a thin film layer which selectively totally reflects only the laser beam of one wavelength of the two wavelengths and totally transmits the laser beam of the other wavelength;

a second transparent layer formed of a second layer contacting the upper portion of the thin film layer and a second recording layer thereon; and a reflection layer for totally reflecting the laser beam having the other wavelength.

\* \* \* \* \*